Patented Jan. 9, 1923.

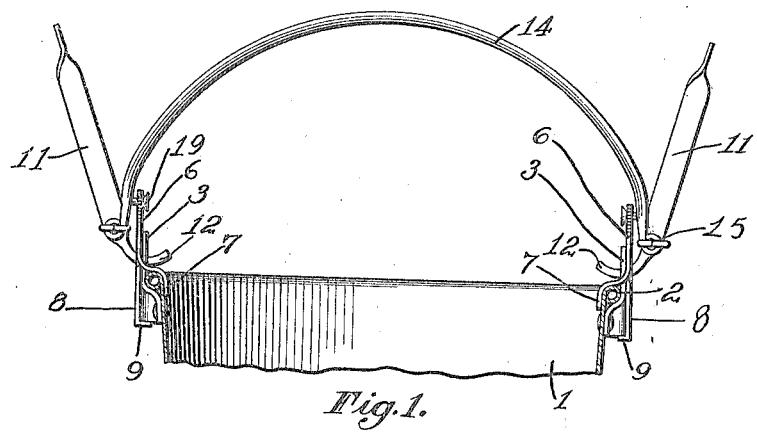
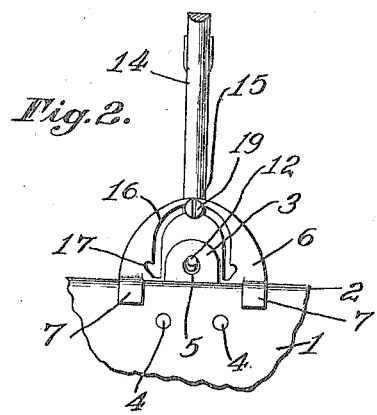
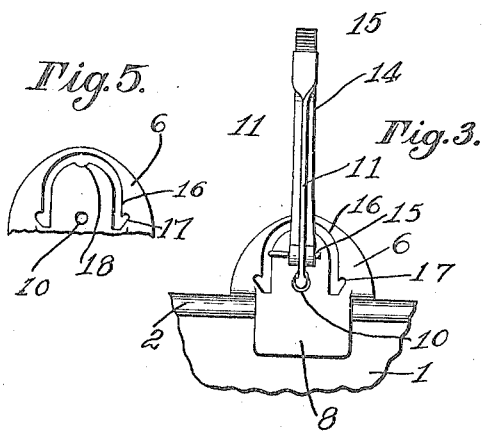
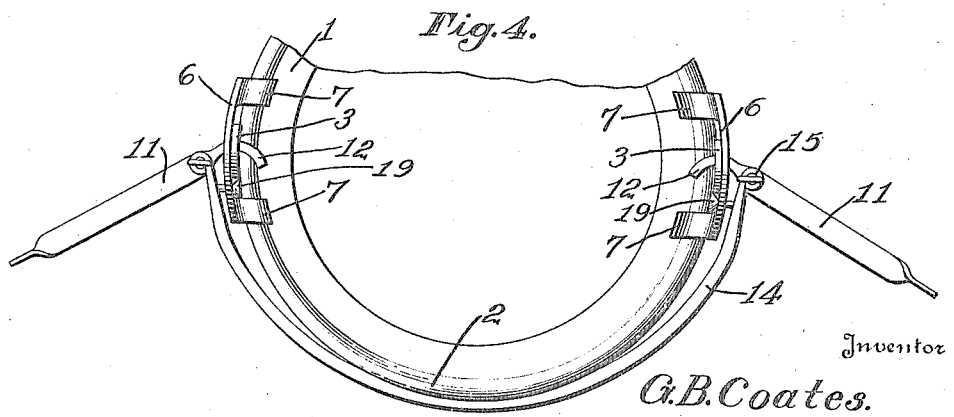

1,441,912

UNITED STATES PATENT OFFICE.

GEORGE B. COATES, OF FRENCH, IDAHO.

AUTOMATIC BUCKET SUPPORT.

Application filed March 24, 1922. Serial No. 546,404.

*To all whom it may concern:*

Be it known that I, GEORGE B. COATES, a citizen of the United States, residing at French, in the county of Payette and State of Idaho, have invented new and useful Automatic Bucket Supports, of which the following is a specification.

This invention aims to provide novel means, under the control of the bail of a bucket, for supporting the bucket on the knees of an operator during the operation of milking.

In the accompanying drawings:

Figure 1 shows in longitudinal section, a portion of a bucket constructed in accordance with the invention; Figure 2 is an end elevation showing a portion of the inner surface of a bucket equipped with the device forming the subject matter of this invention; Figure 3 is an elevation showing a portion of the outer surface of a bucket equipped with the device forming the subject matter of this invention; and Figure 4 is a fragmental top plan showing a portion of a bucket whereon the device forming the subject matter of this application has been mounted; and Fig. 5 is a detail of one of the auxiliary ears.

The numeral 1 denotes the body of an ordinary milking bucket, provided at its upper end with an outwardly extended bead 2. Main ears 3 are secured at 4 to the body 1 and carry the common bail (not shown), the said bail being removed when the device forming the subject matter of this application is applied to the bucket. The ears 3 have openings 5 wherein the aforesaid bail is mounted.

Auxiliary ears 6 are provided, and form part of the bucket. The ears 6 are mounted on the bead 2, and have extensions 7 extended downwardly on the inner surface of the bucket, as shown in Figure 2, each ear having an extension 8, prolonged downwardly on the outer surface of the bucket as shown in Figure 3, each extension 8 having a flange 9 engaged beneath one of the main ears 3. The ears 6 have openings 10 registering with the openings 5 in the ears 3.

Supports 11 are provided, the same having curved ends 12 mounted loosely in the registering openings 10 and 5 of the ears 6 and 3. The numeral 14 marks a bail, the ends whereof are pivoted at 15 to the supports 11 outwardly of the curved ends 12 of the supports. Cam slots 16 of U-shape are fashioned in the ears 6. The intermediate or upper portions of the cam slots 16 are spaced further from the openings 5 and 10 than are the end portions of the cam slots. Seats 17 are formed in the ears 6 at the lower ends of the cam slots. An internal seat is formed in each ear 6 adjacent to the upper end of each cam slot 16, as shown in Figure 5. The bail 14 is provided with projections 19 received slidably in the cam slots 16.

When the bail 14 is swung upwardly into the position shown in Figure 4, the projections 19 ride in the cam slots 16 and, owing to the shape of the cam slots, the bail is elevated. When the bail is elevated, the supports 11 move upwardly into the positions shown in Figure 1, the curved ends 12 of the supports sliding in the registering openings 5 and 10. After the bail 14 has been raised into the position shown in Figure 1, the bail may be moved downwardly to a slight extent, whereupon the projections 19 will engage with the seats 18 of Figure 5, thus holding the bail in the upstanding position delineated in Figure 1.

When the bail 14 is swung downwardly into the position shown in Figure 4, the bail is moved transversely of the axis of the bucket, owing to the shape of the cam slots 16. When the bail 14 moves transversely of the axis of the bucket, as aforesaid, the supports 11 are swung into the outstanding position shown in Figure 4, and may be used to carry the bucket on the knees of the milker, it being unnecessary for the milker to grip the bucket tightly between his knees. When the bail 14 is in the position shown in Figure 4, the bail may be moved transversely of the axis of the bucket, to a slight extent, thereby engaging the projections 19 on the bail in one set of the seats 17, thereby holding the bail in a lowered position, and the supports 11 in an outstanding position.

What is claimed is:—

1. In a device of the class described, a bucket; supports pivoted on the bucket; a bail pivoted to the supports; and a projection on the bail, the bucket having a cam slot receiving the projection, the cam slot being so shaped that when the bail is swung upwardly, the bail will be raised, thereby raising the supports, and being so shaped that when the bail is swung downwardly, the bail will be moved transversely of the axis of the bucket, thereby swinging the supports outwardly.

2. A device of the class described, constructed as set forth in claim 1 and further characterized by the fact that the ear has a seat located adjacent to the upper end of the cam slot and adapted to receive the projection when the bail is swung upwardly.

3. A device of the class described, constructed as set forth in claim 1, and further characterized by the fact that the ear has a seat, located adjacent to the lower end of the cam slot, and adapted to receive the projection when the bail is swung downwardly.

In testimony that I claim the foregoing as my own, I have hereto affixed my signature in the presence of two witnesses.

GEORGE B. COATES.

Witnesses:
CALVIN KELLER,
DANIEL B. COATES.